(12) United States Patent
Marui

(10) Patent No.: US 6,416,071 B2
(45) Date of Patent: Jul. 9, 2002

(54) SUPPORTING STRUCTURE FOR A FORK STEM IN A BICYCLE AND A PROCESS OF MANUFACTURING A SUPPORTING PORTION FOR A FORK STEM IN A BICYCLE

(75) Inventor: Kohei Marui, Kobe (JP)

(73) Assignee: Marui Co., Ltd., Hyogo-ken (JP)

( * ) Notice: Subject to any disclaimer, the term of this patent is extended or adjusted under 35 U.S.C. 154(b) by 0 days.

(21) Appl. No.: 09/752,777

(22) Filed: Jan. 3, 2001

(30) Foreign Application Priority Data

May 29, 2000 (JP) ........................................ 2000-157791

(51) Int. Cl.⁷ ............................................. B62K 21/18
(52) U.S. Cl. ...................................................... 280/279
(58) Field of Search ................................ 280/279, 276, 280/274; 74/551.1; 384/510; 403/367

(56) References Cited

U.S. PATENT DOCUMENTS

| | | | | |
|---|---|---|---|---|
| 4,303,257 A | * | 12/1981 | Perotti et al. ................ | 280/279 |
| 5,330,220 A | * | 7/1994 | Nagano ........................ | 280/279 |
| 5,353,888 A | * | 10/1994 | Tsukahara .................... | 180/219 |
| 5,536,104 A | * | 7/1996 | Chen ........................... | 403/370 |
| 5,681,119 A | * | 10/1997 | Marui .......................... | 384/545 |
| 5,826,898 A | * | 10/1998 | Fortier et al. ................ | 280/279 |
| 5,893,574 A | * | 4/1999 | Campagnolo ................ | 280/279 |
| 5,964,474 A | * | 10/1999 | Chen ........................... | 280/279 |
| 5,979,925 A | * | 11/1999 | Lin .............................. | 280/279 |
| 6,126,323 A | * | 10/2000 | Tange .......................... | 384/545 |
| 6,302,589 B1 | * | 10/2001 | Van Houtte .................. | 384/545 |

* cited by examiner

Primary Examiner—Anne Marie Boehler
Assistant Examiner—Tony Winner
(74) Attorney, Agent, or Firm—Fitch, Even, Tabin & Flannery

(57) ABSTRACT

A structure is disclosed which enables easy manufacture of a supporting portion for a bicycle fork stem. This structure comprises: (i) a head pipe which is formed from a tubular pipe having a constant diameter and which has ball bearing accommodating portions each located at a position interior to an opening end of the head pipe relative to an axial direction, and (ii) ball bearings each of which has steel balls and first and second rings for holding the steel balls therebetween and supports the fork stem passing through the second ring. The ball bearing accommodating portions are each composed of (i) a support ring supported in a push-in inhibited fashion by an annular face that is formed on the inner circumferential surface of the head pipe so as to be perpendicular to an axial direction and (ii) one of the ball bearings with the first ring being supported in a push-in inhibited fashion by the support ring.

7 Claims, 5 Drawing Sheets

SUPPORTING STRUCTURE FOR A FORK STEM IN A BICYCLE AND A PROCESS OF MANUFACTURING A SUPPORTING PORTION FOR A FORK STEM IN A BICYCLE

BACKGROUND OF THE INVENTION

1. Field of the Invention

The present invention relates to the structure of a supporting portion at which a fork stem is supported on a head pipe of a bicycle body and a process of manufacturing such a supporting portion.

2. Disclosure of the Prior Art

FIG. 5 is a cross sectional view showing a conventional structure of a supporting portion for supporting a fork stem on a head pipe of a bicycle body.

The upper and lower ends of a head pipe (15) fitted on a fork stem (13) of a front fork (12) are both enlarged in a flared fashion to respectively form a ball bearing accommodating portion (17). Each ball bearing accommodating portion (17) accommodates a ball bearing (2) of a cartridge type.

Overlaid on the ball bearing (2) mounted on the upper end of the head pipe (15) is a ring-like cover (23). A plug-in cylinder (24) positioned under the cover (23) is fitted in an inner ring (22) that constitutes the ball bearing (2), with the fork stem (13) of the front fork (12) passing through the inner ring (22).

In this structure, the front fork (12) rotates relative to the head pipe (15), being supported by the upper and lower ball bearings (2), which permits handle operation.

The conventional supporting portion described above, however, has to prevent backlash in the ball bearings (2) by bringing the inner circumferential shape of each ball bearing accommodating portion (17) into precise registration with the peripheral shape of an outer ring (21) of each ball bearing (2). Hence, the above conventional supporting portion disadvantageously needs to be finished by high precision cutting of the inner circumferences of the enlarged portions after enlarging the openings at both ends of the head pipe (15), so that considerable labor is involved in the manufacture of the supporting portion for the fork stem.

SUMMARY OF THE INVENTION

An object of the invention is to enable easy manufacture of a supporting portion for a fork stem.

The above object can be accomplished by a first aspect of the invention which provides a supporting structure for a fork stem used in a bicycle, the supporting structure comprising:

a head pipe which is formed from a tubular pipe having a constant diameter and which has ball bearing accommodating portions each located at a position interior to an opening end of the head pipe relative to an axial direction and ball bearings each of which has steel balls and first and second rings for holding the steel balls therebetween and supports the fork stem passing through the second ring, wherein said ball bearing accommodating portions are each composed of (i) a support ring supported in a push-in inhibited fashion by an annular face that is formed on the inner circumferential surface of the head pipe so as to be perpendicular to an axial direction and (ii) one of the ball bearings with the first ring being supported in a push-in inhibited fashion by the support ring.

In the above supporting structure, the following procedure is taken for incorporating each ball bearing in the head pipe. The support ring is supported in a push-in inhibited fashion on the annular face formed at a position interior to an opening end of the head pipe relative to an axial direction. Then, the ball bearing is inserted into the head pipe from its opening end and the first ring of the ball bearing is supported in a push-in inhibited fashion by the support ring, whereby the ball bearing is incorporated in the fork stem. Thereafter, an operation for making the fork stem pass through the second and first rings of the ball bearing is carried out to assemble the fork stem into the head pipe so as to be freely rotatable.

The present invention has the following inherent effect. The head pipe can be produced by simply forming annular faces on the inner circumferential surface of the head pipe, the annular faces being used for assembling the support ring. With this arrangement, there is no need to form flared enlarged portions at both ends of the head pipe and to precisely cut each enlarged portion for registering its inner circumferential shape with the peripheral shape of each ball bearing. Accordingly, the supporting portion for the fork stem can be easily manufactured.

The above object can be also accomplished by a second aspect of the invention which provides a process of manufacturing a supporting portion for a fork stem used in a bicycle, the process comprising:

the first step of cutting, at preset intervals, a long tubular pipe having a constant diameter to form a workpiece;

the second step of cutting the inner circumference of the workpiece at its both ends to form annular recesses, thereby forming a head pipe;

the third step of respectively fitting the peripheral portions of support rings into the annular recesses thereby attaching the support rings to the head pipe;

the fourth step of respectively bringing, from either or both of the ends of the head pipe, ball bearings into engagement with respective portions of the associated support rings, the portions of which project from the annular recesses, thereby allowing the ball bearings to be accommodated within the head pipe; and the fifth step of making the fork stem pass through the ball bearings so that the fork stem is freely rotatably supported on the head pipe by the ball bearings.

In the above method, a long tubular pipe is cut at regular intervals corresponding to the length of a head pipe to be produced, thereby forming a workpiece (the first step). The inner circumference of the workpiece at both ends is then cut to form annular recesses (the second step). Next, the support rings are inserted into the head pipe with their peripheral portions respectively fitted into the annular recesses formed on the inner circumference of the head pipe at the both ends, thereby respectively attaching the support rings to the annular recesses (the third step). Thereafter, ball bearings are inserted into the head pipe from both ends thereof to engage the periphery of each ball bearing with the inner circumference of each support ring, thereby allowing the ball bearings to be respectively supported on the support rings (the fourth step). Finally, the fork stem, which has been inserted into the head pipe from its end, is made to pass through the ball bearings (the fifth step). With this procedure, the fork stem can be freely rotatably attached to the head pipe through the ball bearings.

Other objects, features, aspects and advantages of the invention will become more apparent from the following detailed description of embodiments with reference to the accompanying drawings and appended claims.

DETAILED DESCRIPTION OF THE EMBODIMENT

Figure 1:
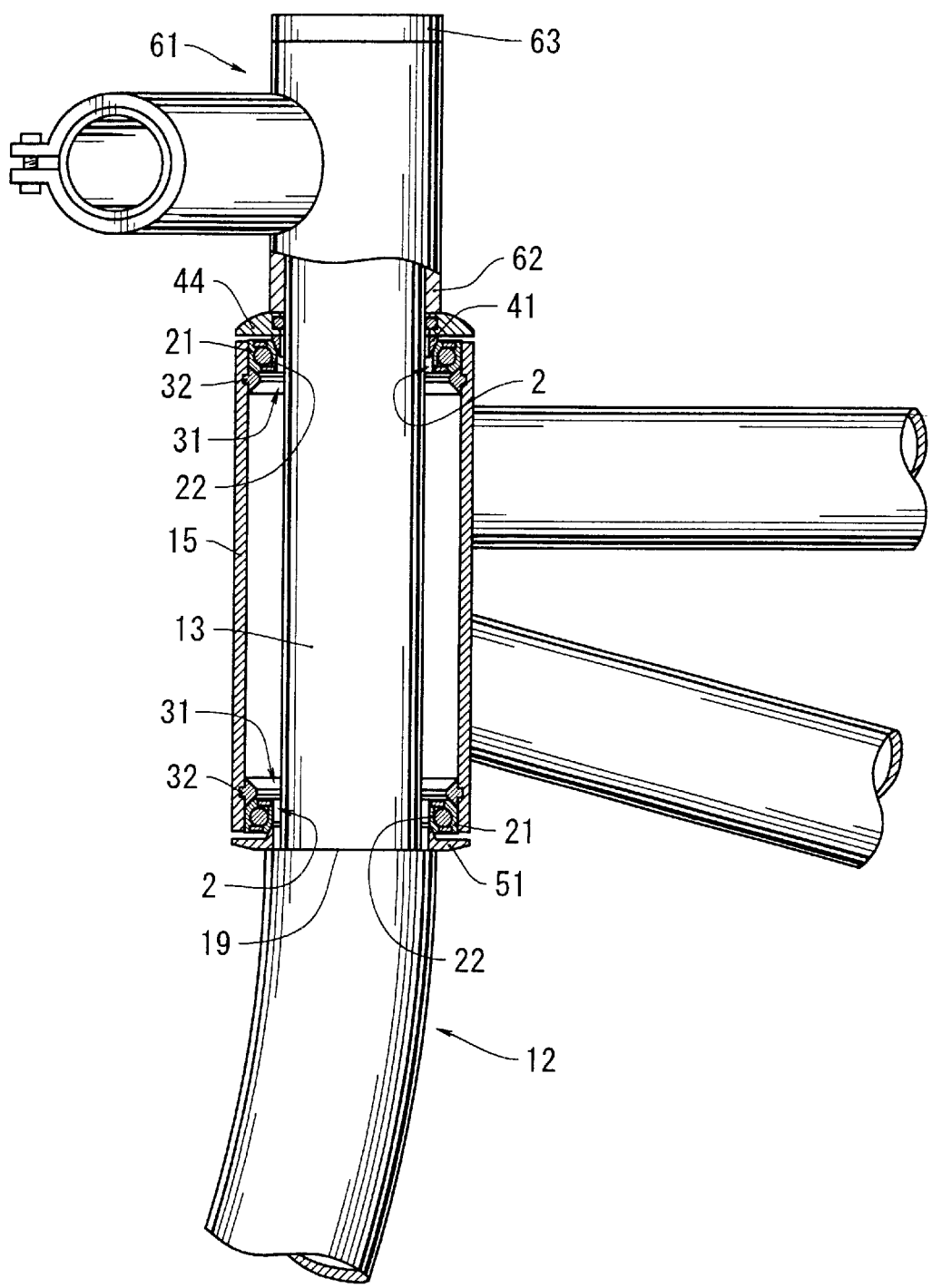
FIG. 1 is a partial cross-sectional view showing the neighborhood of each bicycle ball bearing attaching portion, according to an embodiment of the invention.

Referring now to the drawings, an embodiment of the invention will be described in detail.

Construction

FIG. 1 is a partially cut-away sectional view showing the neighborhood of a head pipe having a supporting structure for a bicycle fork stem according to one embodiment of the invention.

The head pipe (15) of the bicycle body frame is constant in diameter. The head pipe (15) is formed by cutting a long tubular pipe having a constant outer diameter at regular intervals and then cutting the inner circumference of a cut pipe piece at both ends thereof to form recess grooves (16) for receiving support rings (described later) respectively fitted therein. The head pipe (15) is thus formed by only forming recess grooves (16) in the inner circumference of a workpiece at both ends, the workpiece having been formed by cutting a tubular pipe, and therefore can be more easily produced, compared to the manufacture of the conventional head pipe in which the head pipe (15) is radially enlarged at both ends and then, high-precision cutting is performed on the inner circumferences of the radially enlarged portions to form ball bearing accommodating portions (17).

Figure 2:
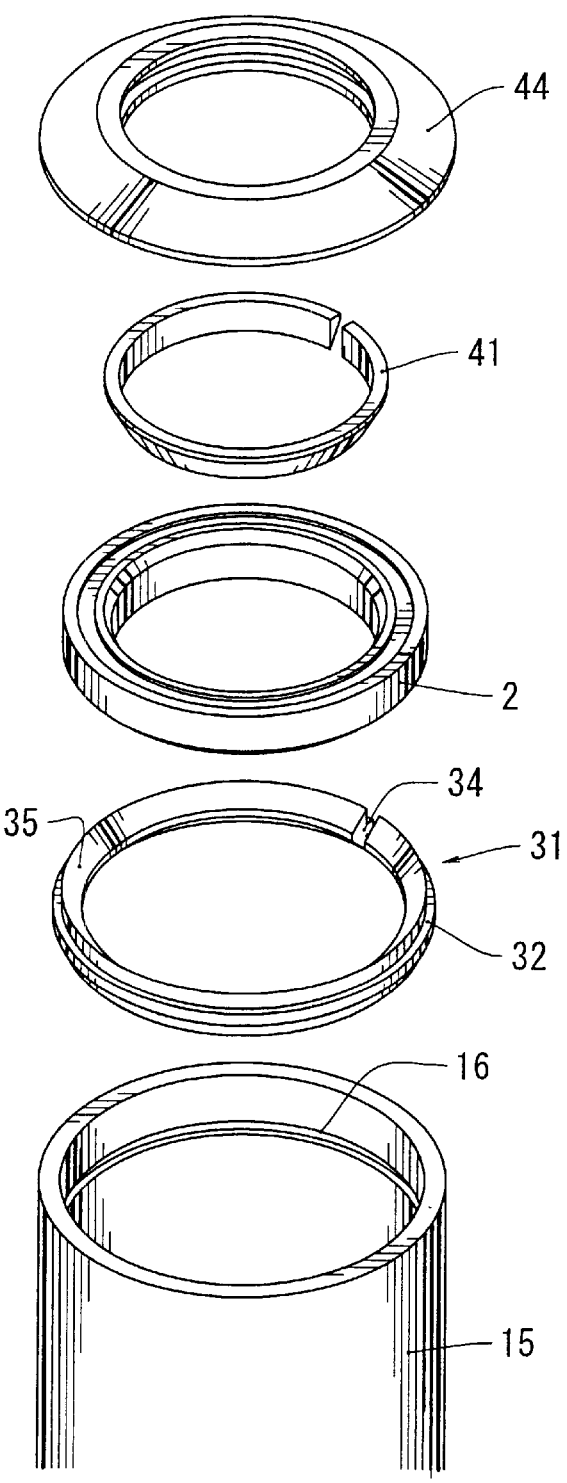
FIG. 2 is an exploded perspective view of each bicycle ball bearing attaching portion, according to the embodiment of the invention.
Figure 3:
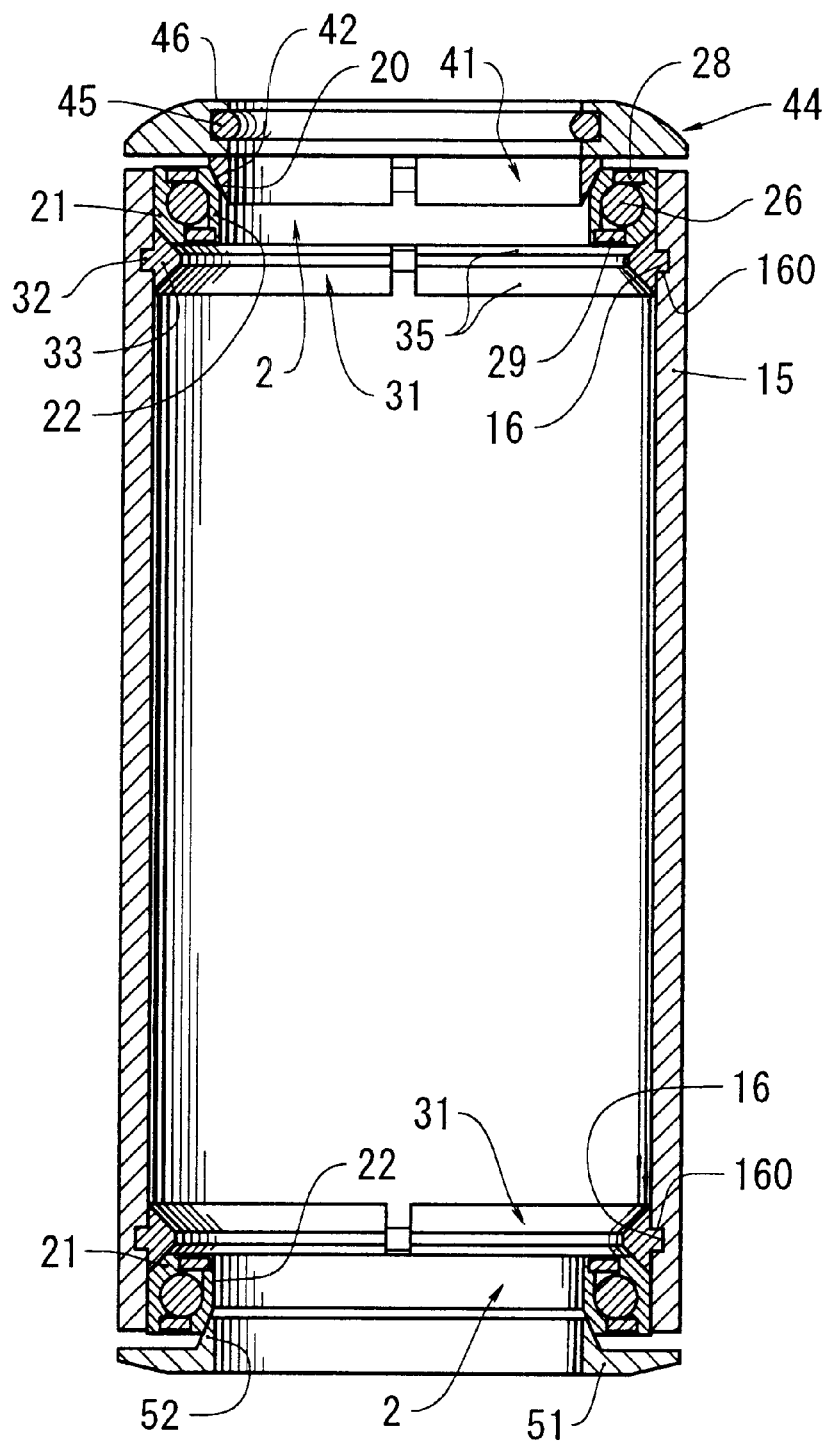
FIG. 3 is a longitudinal sectional view of a head pipe (15) portion, the view being depicted for explaining the embodiment of the invention.

Fitted to each recess groove (16) is the periphery of a support ring (31) made from an elastic metal material. As shown in FIG. 3, the support rings (31) each comprise a peripheral flange (32) entrapped in the recess groove (16) and a head (33) leads to the inner circumference of the peripheral flange (32). The overall shape of the support ring (31) is the letter of C as shown in FIG. 2. The head (33) has a cross section in the form of an isosceles triangle the apex angle portion of which is cut away. The top face (i.e., the top face which is located on the inner circumferential side of the support ring (31) and resulted from the cutting away of the apex angle portion) of the head (33) is positioned between a pair of faces (35), which are respectively tapered.

Supported by each support ring (31) is a cartridge type ball bearing (2) in which an outer ring (21) corresponding to the aforesaid first ring and an inner ring (22) corresponding to the aforesaid second ring are concentrically disposed with steel balls (26) between the inner circumference of the outer ring (21) and the periphery of the inner ring (22). Ball retaining rings (28), (29) are also provided between the periphery of the inner ring (22) and the inner circumference of the outer ring (21) to prevent dropping of the steel balls (26).

The ball bearing (2) mounted on the upper end of the head pipe (15) has a tapered face (20) at the inner circumference of the upper end portion thereof. At the tapered face (20), the ball bearing (2) is in abutting engagement with a press ring (41) whose periphery is tapered down, forming a tapered face (42) which has such a shape as to register with the tapered face (20) of the ball bearing (2). A top cover (44) is overlaid on the upper end face of the press ring (41). The top cover (44) has the same outer diameter as the head pipe (15) and the inner circumference of the top cover (44) is provided with an annular groove (46) for receiving an O ring (45) fitted therein.

Attached to the underside of the ball bearing (2) mounted on the lower end of the head pipe (15) is an under cover (51) which has outer diameter coincident with the outer diameter of the head pipe (15) and which is provided with a fitting cylinder (52) fitted to the inner circumference of the ball bearing (2).

Assembling Operation

Next, there will be explained an operation for assembling the fork stem on the head pipe by use of the above described parts.

The C-shaped support rings (31) are shrunk to reduce their diameter and inserted into the head pipe (15) from both ends of the head pipe (15). Then, the peripheral flanges (32) of the support rings (31) are respectively fitted in the recess grooves (16) formed on the inner circumference of the head pipe (15) at its both ends. Through this procedure, the support rings (31) are attached to the head pipe (15), whereupon the peripheral flange (32) of each support ring (31) is supported by one groove side face (160) which leads to the bottom of the recess groove (16), such that the support ring (31) is prevented from being pushed further into the head pipe (15). Specifically, the peripheral flange (32) of each support ring (31) is supported by the inner one (160) of a pair of groove side faces which constitute the inner surface of the recess groove (16), such that the ring (31) is prevented from moving further into the head pipe (15). In addition, the peripheral flange (32) of each support ring (31) is held between the pair of groove side faces whereby sufficient stability for the support ring (31) can be ensured.

It should be noted that the space between the mounting section of each support ring (31) and each end of the head pipe (15) corresponds to each of the aforesaid ball bearing accommodating portions.

From the upper end of the fork stem (13) of the front fork (12), the under cover (51) and one of the ball bearings (2) are fitted, in this order, onto the fork stem (13) such that they are seated on a fork crown (19) located in the proximal end of the fork stem (13).

Then, the fork stem (13) is inserted into the head pipe (15) from its lower end such that the upper end of the fork stem (13) is allowed to project upward. This brings the outer ring (21) of the ball bearing (2) mounted on the fork crown (19) into engagement with a tapered face (35) of the support ring (31) attached to the lower part of the head pipe (15), so that the ball bearing (2) is stably held between the support ring (31) and the under cover (51), being pressed from above and below.

Thereafter, the other ball bearing (2), the press ring (41) and the top cover (44) are fitted on the fork stem (13) in this order from the upper end of the fork stem (13). The outer ring (21) of the ball bearing (2) then comes into engagement with the inclined face (35) of the support ring (31), whereby the ball bearing (2) is supported by the support ring (31).

Specifically, the outer ring (21) is brought into contact with the support ring (31) from the end of the head pipe (15) so that the ball bearing (2) is supported by the support ring (31). Moreover, the contact face of the support ring (31) with respect to the outer ring (21) is the tapered face (35) which is so formed that the diameter of the support ring (31) increases as the contact face is closer to the upper end of the head pipe (15). Therefore, in this arrangement, the periphery of the ball bearing (2) is pressed against the tapered face (35) of the support ring (31), which facilitates positioning of the ball bearing (2) at the center of the head pipe by the guiding function of the tapered face (35).

The press ring (41) is fitted to the inner circumference of the upper end portion of the inner ring (22) which constitutes the ball bearing (2), and the top cover (44) is overlaid on the press ring (41).

Then, as shown in FIG. 1, a fixing cylinder (62) for a handle stem (61) is fitted on the fork stem (13) from its upper end and the top cover (44) is pressed down by the lower end of the fixing cylinder (62). Subsequently, a clamp screw (63) is threaded into a female screw (not shown) formed on the inner circumference of the upper end of the fork stem (13), thereby securing the handle stem (61) to the fork stem (13).

Others

① Although ball bearings each having the inner ring (22) and outer ring (21) which have different radius are used in the foregoing embodiment, ball bearings of an alternative type may be used, in which the steel balls (26) are held between the first and second rings which have the same radius, the balls (26) being pressed in a vertical direction (i.e., the axial direction of the head pipe (15)).

Figure 4:
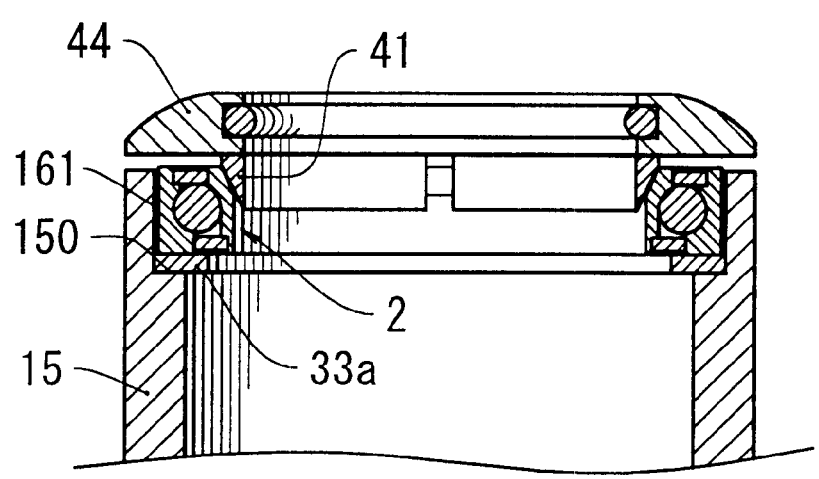
FIG. 4 is a fundamental part cross-sectional view showing a variation of the ball bearing attaching portion.
Figure 5:
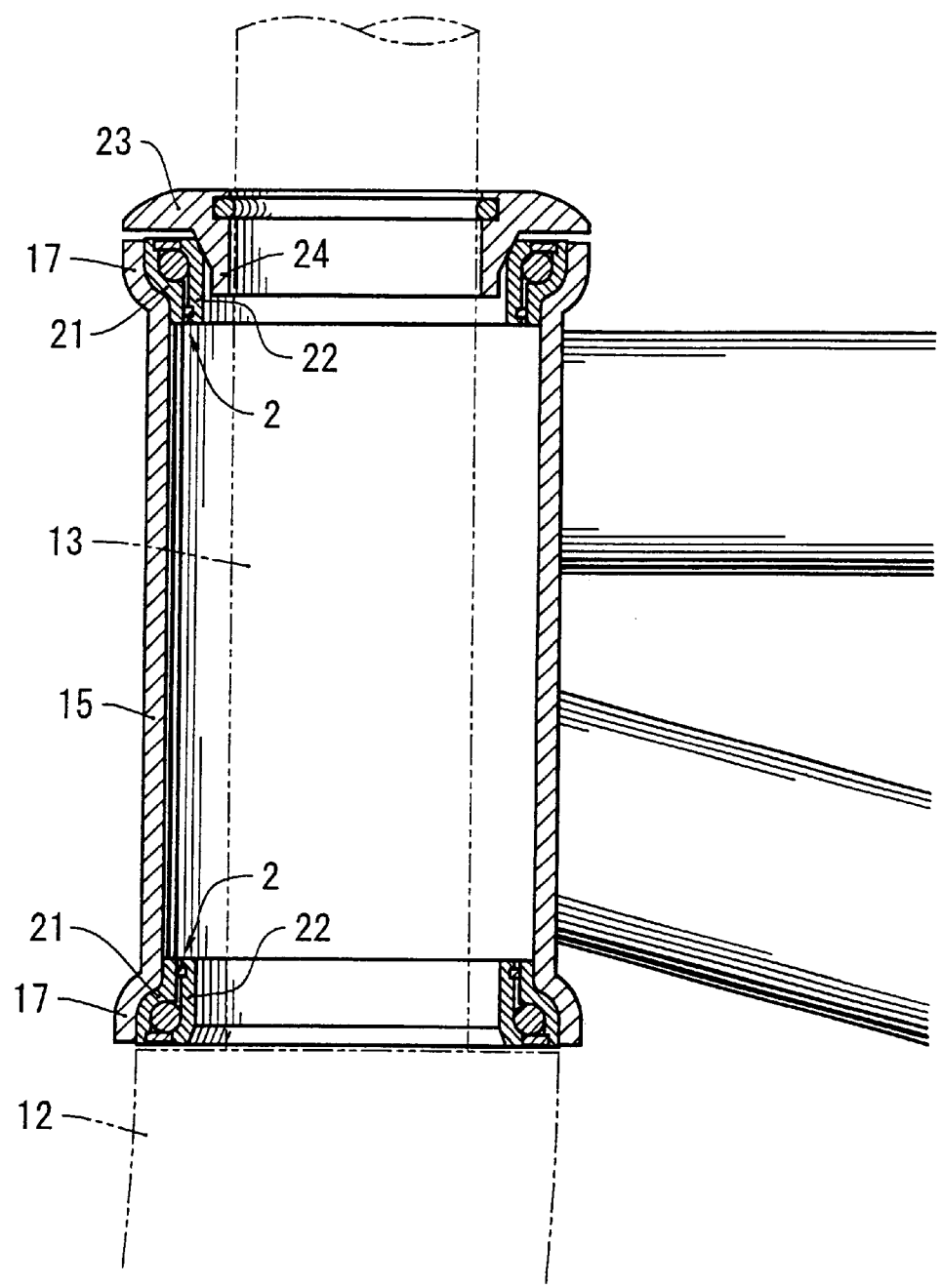
FIG. 5 is an explanatory view of the prior art.

② Although the C-shaped support rings (32) are respectively fitted in the recess grooves (16) formed in the inner circumference of the head pipe (15) at both ends thereof in the foregoing embodiment, another arrangement is possibly adapted in which the inner circumference of the head pipe (15) at each end is cut to form an enlarged diameter portion (161) which serves as an annular recess and a support ring (33a) made of an annular flat plate is engaged with a step portion (150) of the enlarged diameter portion (161), as shown in FIG. 4. In the latter case, the step portion (150) corresponds to the annular face described earlier.

What is claimed is:

1. A supporting structure for a fork stem used in a bicycle, the supporting structure comprising:

a head pipe which is formed from a tubular pipe having a constant diameter and which has ball bearing accommodating portions each located at a position interior to an opening end of the head pipe relative to an axial direction and ball bearings each of which has steel balls and first and second rings for holding the steel balls therebetween and supports the fork stem passing through the second ring, wherein said ball bearing accommodating portions are each composed of (i) a support ring supported in a push-in inhibited fashion by an annular face that is formed on the inner circumferential surface of the head pipe so as to be perpendicular to an axial direction and (ii) one of the ball bearings with the first ring being supported in a push-in inhibited fashion by the support ring.

2. A supporting structure for a fork stem used in a bicycle according to claim 1, wherein the first ring and the second ring which is smaller than the first ring in diameter are concentrically disposed and the steel balls are held between the inner circumference of the first ring and the outer circumference of the second ring.

3. A supporting structure for a fork stem used in a bicycle according to claim 1, wherein the steel balls are held between the first and second rings, being axially pressed by the first and second rings.

4. A supporting structure for a fork stem used in a bicycle according to claim 1, wherein each annular face is a groove side face of a recess groove formed in the inner circumference of the head pipe, wherein the support ring is a C-shaped ring.

5. A supporting structure for a fork stem used in a bicycle according to claim 1, wherein the first ring comes into contact with the support ring from an end of the head pipe, whereby the ball bearing is supported by the support ring and wherein the contact face of the support ring with respect to the first ring is tapered such that the diameter of the support ring increases as the contact face is closer to the end of the head pipe.

6. A supporting structure for a fork stem used in a bicycle according to claim 4, wherein the first ring comes into contact with the support ring from an end of the head pipe, whereby the ball bearing is supported by the support ring and wherein the contact face of the support ring with respect to the first ring is tapered such that the diameter of the support ring increases as the contact face is closer to the end of the head pipe.

7. A process of manufacturing a supporting portion for a fork stem used in a bicycle, the process comprising:

the first step of cutting, at preset intervals, a long tubular pipe having a constant diameter to form a workpiece;

the second step of cutting the inner circumference of the workpiece at its both ends to form annular recesses, thereby forming a head pipe;

the third step of respectively fitting the peripheral portions of support rings into the annular recesses thereby attaching the support rings to the head pipe;

the fourth step of respectively bringing, from either or both of the ends of the head pipe, ball bearings into engagement with respective portions of the associated support rings, the portions of which project from the annular recesses, thereby allowing the ball bearings to be accommodated within the head pipe; and the fifth step of making the fork stem pass through the ball bearings so that the fork stem is freely rotatably supported on the head pipe by the ball bearings.

* * * * *